(12) United States Patent
Tao et al.

(10) Patent No.: US 12,247,651 B2
(45) Date of Patent: Mar. 11, 2025

(54) GEARBOX HOUSING AND METHOD OF MANUFACTURING THE SAME

(71) Applicant: ABB Schweiz AG, Baden (CH)

(72) Inventors: Zhiqiang Tao, Beijing (CN); Hao Gu, Shanghai (CN); Wei Song, Shanghai (CN); Bo Qiao, Beijing (CN); Lei Wang, Beijing (CN)

(73) Assignee: ABB Schweiz AG, Baden (CH)

( * ) Notice: Subject to any disclaimer, the term of this patent is extended or adjusted under 35 U.S.C. 154(b) by 88 days.

(21) Appl. No.: 17/995,912

(22) PCT Filed: May 6, 2020

(86) PCT No.: PCT/CN2020/088811
§ 371 (c)(1),
(2) Date: Oct. 10, 2022

(87) PCT Pub. No.: WO2021/223112
PCT Pub. Date: Nov. 11, 2021

(65) Prior Publication Data
US 2023/0184319 A1    Jun. 15, 2023

(51) Int. Cl.
*F16H 57/02* (2012.01)
*F16H 1/32* (2006.01)
(Continued)

(52) U.S. Cl.
CPC ............. *F16H 57/02* (2013.01); *F16H 55/17* (2013.01); *F16H 57/023* (2013.01);
(Continued)

(58) Field of Classification Search
CPC .......... F16H 1/32; F16H 49/001; F16H 55/06; F16H 55/17; F16H 2055/076;
(Continued)

(56) References Cited

U.S. PATENT DOCUMENTS 2,170,951 A * 8/1939 Perry ................. F16H 1/32
475/159
3,129,611 A * 4/1964 Lee ................... F16H 1/46
475/179
(Continued)

FOREIGN PATENT DOCUMENTS

CN     104141745 A      11/2014
CN     104595425 A  *   5/2015  ............... F16H 1/32
(Continued)

OTHER PUBLICATIONS

Machine translation of DE 102010031340 A1 obtained on Mar. 27, 2024.*
(Continued)

*Primary Examiner* — Adam D Rogers
(74) *Attorney, Agent, or Firm* — Greenberg Traurig, LLP

(57) ABSTRACT

Embodiments of the present disclosure relate to a gearbox housing. The gearbox housing has a housing body and an annular gear. The housing body comprises an annular support and a lateral portion provided at a side face of the annular support. The lateral portion has a hole formed thereon for an input shaft to pass through. The annular gear is provided inside of the housing body along a radial direction and adapted to couple to the annular support, wherein a plurality of teeth are circumferentially provided at an inner side of the annular gear. A gear wheel with an output shaft is adapted to couple to the plurality of teeth.

9 Claims, 4 Drawing Sheets

(51) Int. Cl.
  *F16H 49/00* (2006.01)
  *F16H 55/02* (2006.01)
  *F16H 55/17* (2006.01)
  *F16H 57/023* (2012.01)
  *F16H 57/032* (2012.01)
  *F16H 55/06* (2006.01)

(52) U.S. Cl.
  CPC ............ *F16H 57/032* (2013.01); *F16H 1/32* (2013.01); *F16H 49/001* (2013.01); *F16H 55/06* (2013.01); *F16H 2057/02017* (2013.01); *F16H 2057/0325* (2013.01)

(58) Field of Classification Search
  CPC ...... F16H 57/02; F16H 57/023; F16H 57/032; F16H 2057/02017; F16H 2057/02073; F16H 2057/0325
  See application file for complete search history.

(56) References Cited

U.S. PATENT DOCUMENTS

| | | | | |
|---|---|---|---|---|
| 3,478,623 | A * | 11/1969 | Noguchi | F16H 13/06 475/165 |
| 3,546,959 | A * | 12/1970 | Carlson | F16H 55/06 74/439 |
| 4,112,788 | A * | 9/1978 | Sfredda | F16H 1/32 475/181 |
| 4,155,276 | A * | 5/1979 | Fengler | F16H 1/32 475/181 |
| 4,183,266 | A * | 1/1980 | Osumi | F16H 1/46 475/331 |
| 4,429,595 | A * | 2/1984 | Butterfield | F16D 3/04 475/180 |
| 4,567,790 | A * | 2/1986 | Butterfield | F16H 1/32 475/179 |
| 6,012,350 | A * | 1/2000 | Mizuta | F16H 55/17 475/901 |
| 8,684,878 | B2 * | 4/2014 | Sato | F16H 1/32 475/168 |
| 9,005,066 | B2 * | 4/2015 | Sato | F16H 1/32 475/168 |
| 9,127,753 | B2 * | 9/2015 | Akiyoshi | F16H 3/62 |
| 10,495,206 | B2 * | 12/2019 | Zhu | F16H 57/08 |
| 10,495,210 | B2 * | 12/2019 | Hasan | F03D 15/00 |
| 10,823,268 | B2 * | 11/2020 | Balsiger | F16H 49/001 |
| 10,843,335 | B2 * | 11/2020 | Kusumoto | F16H 57/0445 |
| 11,499,622 | B2 * | 11/2022 | Makisumi | F16H 55/10 |
| 11,725,719 | B2 * | 8/2023 | Aki | B29C 45/14 74/413 |
| 2012/0227529 | A1 * | 9/2012 | Fischer | F16H 55/06 74/434 |
| 2018/0281177 | A1 | 10/2018 | Kusumoto | |
| 2019/0048983 | A1 | 2/2019 | Modrzejewski et al. | |
| 2024/0191780 | A1 * | 6/2024 | Zhang | F16H 1/28 |

FOREIGN PATENT DOCUMENTS

| | | | | |
|---|---|---|---|---|
| CN | 204647211 | U | 9/2015 | |
| CN | 205064618 | U | 3/2016 | |
| CN | 105736644 | A | 7/2016 | |
| CN | 205534044 | U | 8/2016 | |
| CN | 104110485 | B | 2/2017 | |
| CN | 106838138 | A | 6/2017 | |
| CN | 107489753 | A * | 12/2017 | ............... F16H 1/32 |
| CN | 109139855 | A * | 1/2019 | ............ F16H 49/001 |
| CN | 110285196 | A | 9/2019 | |
| CN | 112343971 | A * | 2/2021 | ............... F16H 1/32 |
| DE | 19823510 | A1 * | 12/1998 | ................ B22F 3/03 |
| DE | 10333951 | B3 * | 11/2004 | ............ F16H 49/001 |
| DE | 102010031340 | A1 * | 7/2011 | ............ F16H 57/031 |
| DE | 102010060927 | A1 * | 6/2012 | ............... B21D 22/16 |
| DE | 102016220916 | A1 * | 10/2017 | |
| DE | 102019100352 | A1 * | 8/2019 | ......... B29C 45/0046 |
| DE | 102018203187 | A1 * | 9/2019 | |
| DE | 112013002253 | T5 | 12/2022 | |
| EP | 3483432 | A1 | 5/2019 | |
| JP | 2006070914 | A | 3/2006 | |
| JP | 2010139041 | A | 6/2010 | |
| KR | 101708565 | B1 * | 2/2017 | |
| WO | WO-2006034921 | A1 * | 4/2006 | ............... F16H 1/32 |
| WO | 202000303 | W | 1/2020 | |

OTHER PUBLICATIONS

Machine translation of CN 107489753 A obtained on Mar. 27, 2024.*

International Search Report and Written Opinion, issued by the ISA/CN National Intellectual Property Administration; regarding corresponding patent application Serial No. PCT/CN2020/088811; dated Feb. 18, 2021; 8 Pages.

* cited by examiner

GEARBOX HOUSING AND METHOD OF MANUFACTURING THE SAME

CROSS-REFERENCE TO RELATED APPLICATIONS

This is a national stage application which claims priority to International patent application Serial No.: PCT/CN2020/088811, filed on May 6, 2020; and which is herein incorporated by reference in its entirety.

FIELD

Example embodiments of the present disclosure generally relate to the plastic industrial robots, and more particularly, to a gearbox housing and a method of the manufacturing the gearbox housing.

BACKGROUND

For the plastic industrial robots, it is important to keep the shape during the manufactory. The shrinkage of the plastic materials during the processing will affect the final dimensional accuracy.

Conventionally, the gearbox housing is produced as an integral component. In case that the gearbox housing is made of plastic, the shrinkage of housing would be significant. As the size of the teeth in the gearbox is quite crucial for meshing the teeth of the cooperating gear wheel, such a great shrinkage would affect the accurate meshing between the gearbox and the gear wheel.

In conventional solution, process parameter adjustment and mold refinishing iteration are involved. Such approaches take more time and depend on rich processing experience, which means high cost and complexity. In CN204647211U, a solution is proposed for improving the efficiency of the tooth ring and reducing the weight of the speed variator. However, this solution is complicated and thus the use of the speed variator would be limited.

Therefore, there is a need for an easier and cheaper design to improve the accuracy of the plastic gearbox housing by reducing the shrinkage during the production.

SUMMARY

Example embodiments of the present disclosure propose a solution for reducing the shrinkage of the material in a convenient and cheap way.

In a first aspect, embodiments of the present disclosure relate to a gearbox housing. The gearbox housing comprises: a housing body, comprising: an annular support extending along an axial direction; and a lateral portion provided at a side face of the annular support perpendicular to the axial direction, the lateral portion comprising a hole formed thereon for an input shaft to pass through, and an annular gear provided inside of the housing body along a radial direction and adapted to couple to the annular support, wherein a plurality of teeth are circumferentially provided at an inner side of the annular gear, and wherein a gear wheel with an output shaft is adapted to couple to the plurality of teeth.

According to embodiments of the present disclosure, the gearbox housing can ensure the high accuracy of the working profile of the teeth with a cost-effective manner.

In some embodiments, the gearbox housing further comprising a ring made of metal and circumferentially coupled to the annular gear.

In some embodiments, the housing body and the annular gear are connected mechanically.

In some embodiments, the housing body and the annular gear are integrally formed via injection molding.

In some embodiments, the housing body is made of plastic.

In some embodiments, the annular gear is made of plastic or metal.

In some embodiments, the annular support and the lateral portion are integrally formed.

In some embodiments, the annular gear is a cycloidal gear, a planetary gear and/or a harmonic gear.

In a second aspect, embodiments of the present disclosure relate to a method of manufacturing a gearbox housing. The method comprises: providing a housing body, comprising: providing an annular support extending along an axial direction; and providing a lateral portion at a side face of the annular support perpendicular to the axial direction, the lateral portion comprising a hole formed thereon for an input shaft to pass through, and providing an annular gear inside of the housing body along a radial direction, the annular gear being adapted to couple to the annular support, wherein a plurality of teeth are circumferentially provided at an inner side of the annular gear, and wherein a gear wheel with an output shaft is adapted to couple to the plurality of teeth.

In some embodiments, the housing body is formed via injection molding and then the annular gear is formed via injection molding.

In some embodiments, the housing body is formed via injection molding and the annular gear is connected to the housing body mechanically.

In some embodiments, providing the annular gear comprises coupling a ring made of metal to the annular gear during the injection molding.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
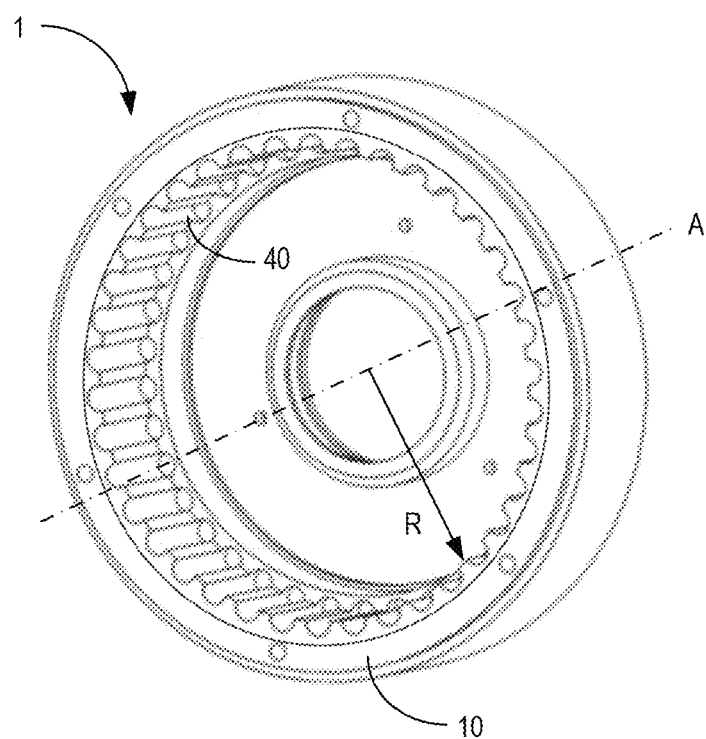
FIG. 1 illustrates a perspective view of a two-part gearbox housing in accordance with an example embodiment of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state that can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

Embodiments of the present invention will be described in detail with reference to FIGS. 1-4 hereinafter.

Figure 2:
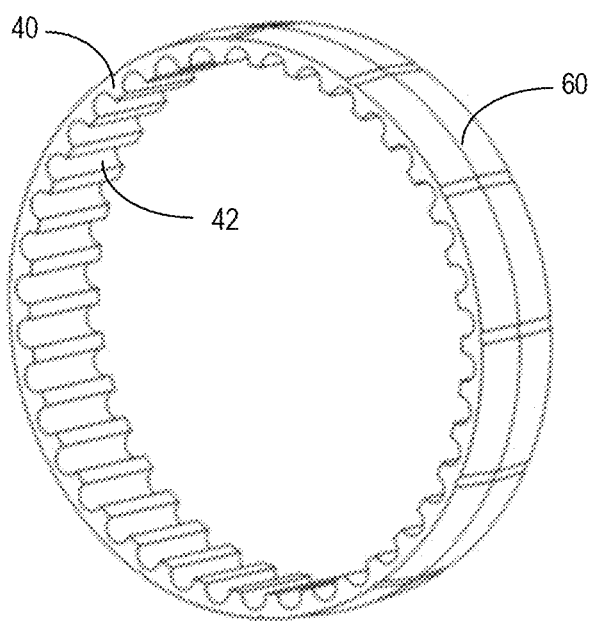
FIG. 2 illustrates a perspective view of a portion of the gearbox housing of FIG. 1, showing an annular gear of the gearbox housing.
Figure 3:
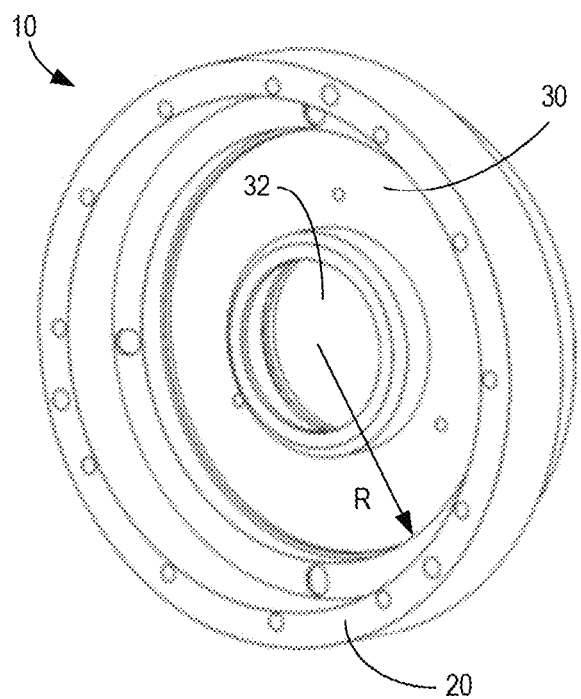
FIG. 3 illustrates a perspective view of another portion of the gearbox housing of FIG. 1, showing a housing body of the gearbox housing.

FIG. 1 illustrates a perspective view of a two-part gearbox housing 1 in accordance with an example embodiment of the present disclosure. FIGS. 2 and 3 illustrate the two portions of the gearbox housing 1 respectively.

As illustrated in FIG. 1, the gearbox housing 1 generally comprises a housing body 10 and an annular gear 40 provided inside the housing body 10 along a radial direction R. the annular gear 40 is configured to couple to the housing body 10.

As illustrated in FIG. 3, the housing body 10 generally comprises an annular support 20 and a lateral portion 30. The annular support 20 extends circumferentially and also extends along an axial direction A. As illustrated, the lateral portion 30 is provided at a side of the annular support 20 and the side is normal to the axial direction A. A hole 32 is formed on the lateral portion 30 for an input shaft to pass through.

Figure 6:
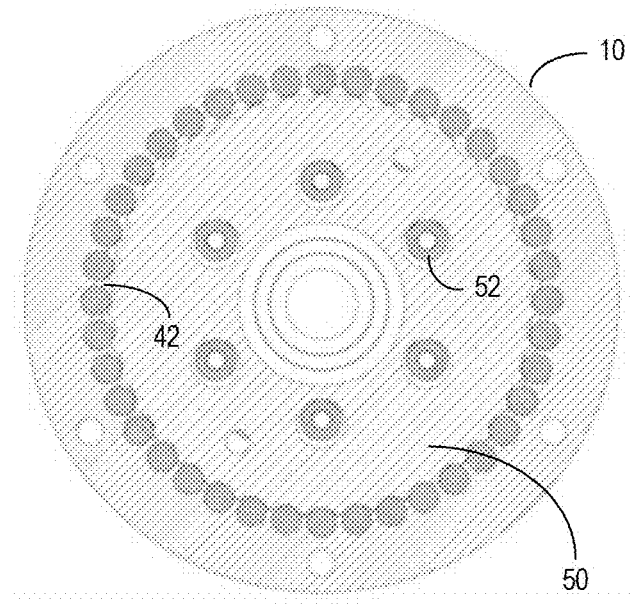
FIG. 6 illustrates a sectional view of the annular gear and its corresponding gear wheel in accordance with some example embodiments of the present disclosure.

As illustrated in FIG. 2, a plurality of teeth 42 are circumferentially provided at an inner side of the annular gear 40. As illustrated in FIG. 6, a gear wheel 50 with an output shaft 52 is adapted to couple to the teeth 42.

According to embodiments of the present disclosure, the gearbox housing 1 is divided into two parts. The inner part, i.e., the annular gear 40 requires higher accuracy and the outer part, i.e., the housing body 10 requires relatively lower accuracy. By manufacturing these two parts separately, the shrinkage of the material can be kept at a lower extent. In this way, the accuracy during the manufacturing the gearbox housing 1 can be improved.

For the conventional approach, for example, the width of gearbox housing 1 along the radial direction R is 20 mm. Given the shrinkage rate is 0.3%, then the change of the size of the gearbox housing 1 would be 0.060 mm. According to embodiments of the present disclosure, by dividing the gearbox housing into two parts, the dimension related to the gear is reduced. If the width of the annular gear 40 is taken as 4 mm, for example, also given 0.3% of the shrinkage rate, the change of the size related to the gear is 0.012 mm, which is only one fifth of that of the conventional approach. In this way, the teeth 42 would shrink much less than the conventional approach. Therefore, the problem incurred by the material shrinkage during production may be alleviated. It is to be understood that these numeral values are merely example without suggesting any limitation as to the scope of the present disclosure.

Figure 5:
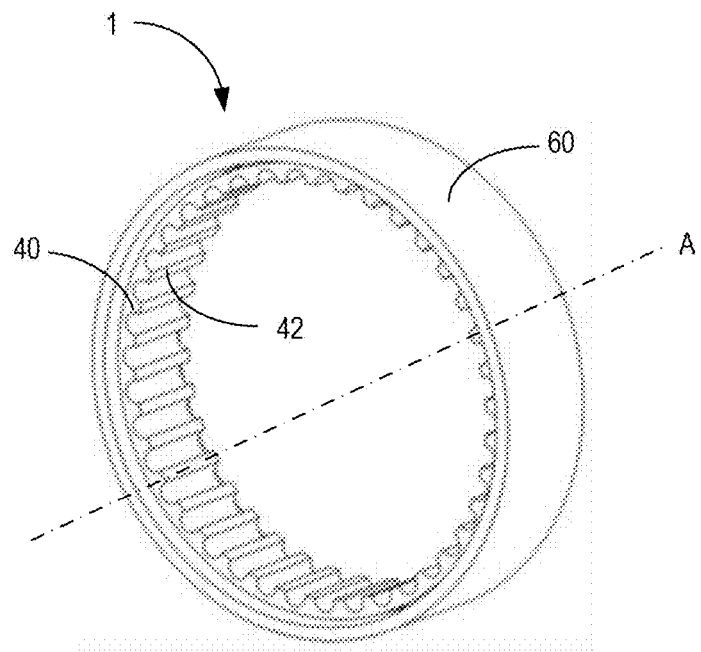
FIG. 5 illustrates a perspective view of another portion of the gearbox housing of FIG. 1, showing a housing body of the gearbox housing.

As illustrated in FIG. 5, in some embodiments, the gearbox housing 1 may further comprise a ring 60 made of metal. The ring 60 may be coupled to the annular gear 40 in circumferential direction. In this way, the stiffness of the annular gear 40 can be improved with the ring 60. Moreover, considering the fact that the annular gear 40 is a relatively thin layer structure, by providing the ring 60, the warpage along the axial direction A can be avoided.

In some embodiments, the ring 60 may be wider than the annular gear 40 in the axial direction A. In this way, the ring 60 can effectively support the annular gear 40.

According to embodiments of the present disclosure, the housing body 10 and the annular gear 40 may be bonded with different approaches. They may be mechanically connected to each other or be manufactured with injection molding, which will be described in more details hereinafter.

In some embodiments, the housing body 10 and the annular gear 40 may be connected via screws. In this way, once the annular gear 40, especially the teeth 42 thereof, is worn out and requires replacement, it could be easily detached from the annular support 20. Moreover, if the dimension of the teeth 42 need to be changed according to the need of the users, the annular gear 40 can be replaced in a convenient way and annular support 20 may be used repeatedly. The cost of the gearbox housing 1 can be reduced accordingly. It is to be understood that the housing body 10 and the annular gear 40 may be coupled to each other in other manners, for example, the clamping connection.

In the alternative embodiments, the housing body 10 and the annular gear 40 may be integrally formed via injection molding. The housing body 10 and the annular gear 40 may be manufactured by two-step injection molding process. The first step is to form the housing body 10 via injection molding and the second step is to form the annular gear 40. As the annular gear 40 is formed at a later stage, the size of the teeth 42 may be ensured to meet the requirement.

In some embodiments, the housing body 10 may be made of plastic. In some embodiments, the annular gear 40 may be made of plastic or metal. In the alternative embodiments, the housing body 10 may be made of nylon. In the alternative embodiments, the annular gear 40 may be made of aluminum. It is to be understood that the material listed are only for illustration without suggesting any limitations as to the scope of the subject matter described herein.

In case that the housing body 10 and the annular gear 40 may be manufactured by two-step injection molding, the housing body 10 may be formed of a material with a greater molding point than that of the annular gear 40. In this way, once the housing body 10 has been made, it would not be changed during the manufacture of the annular gear 40.

In some embodiments, the annular support 20 and the lateral portion 30 may be integrally formed. In this way, the stiffness of the housing body 10 can be ensured.

In some embodiments, the annular gear 40 may be a cycloidal gear, a planetary gear and/or a harmonic gear. It is to be understood that this is merely an example without suggesting any limitation as to the scope of the present disclosure. The annular gear 40 may be an internal gear or an external gear.

Figure 4:
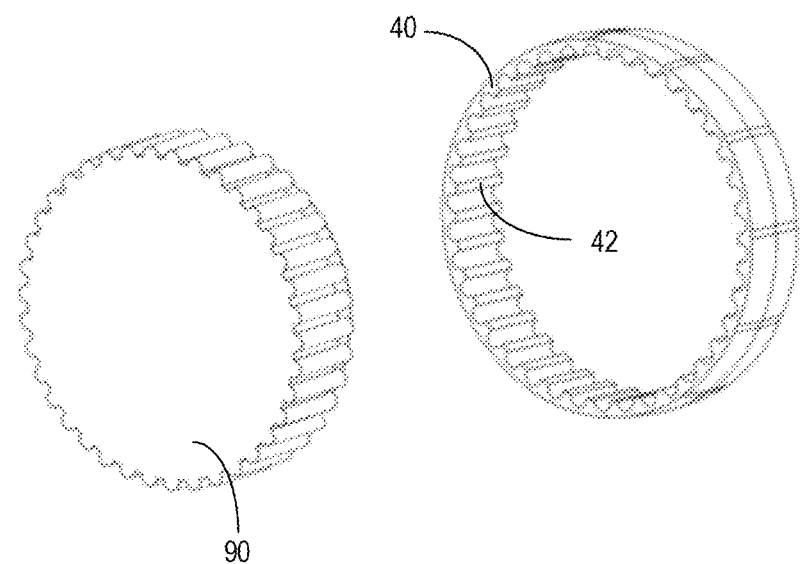
FIG. 4 illustrates an example annular gear and its corresponding mold in accordance with some example embodiments of the present disclosure.

FIG. 4 illustrates an example annular gear 40 and its corresponding mold 90 in accordance with some example embodiments of the present disclosure.

As illustrated in FIG. 4, in some embodiments, the mold 90 could be used during the production of the annular gear 40, so as to ensure the working profile and positioning of the inner surface of gearbox housing 1. Considering the draft angle for mold design, the mold 90 may have a tapered feature, which can make it easier to take off from the plastic material after the production. Therefore, engaging with a tapered gear with a matched profile, the gearbox housing 1 with such a tapered shape can eliminate the backlash with axial pre-loading.

Figure 7:
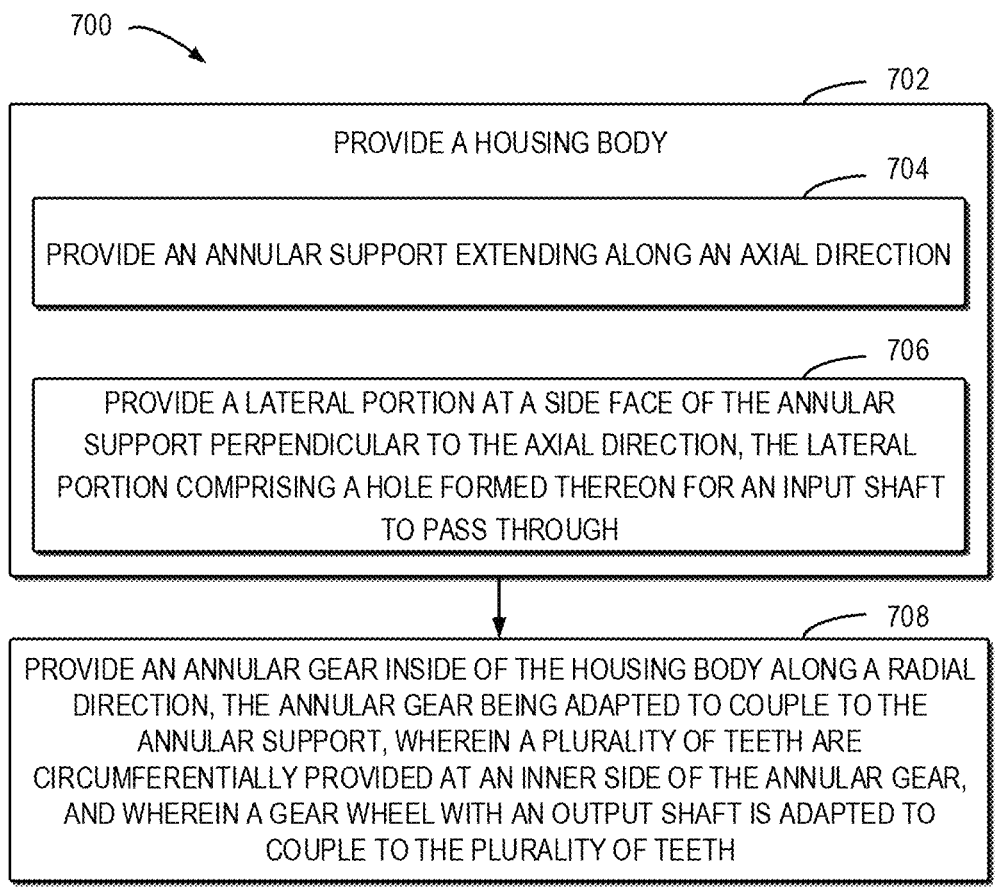
FIG. 7 illustrates a method of manufacturing a gearbox housing in accordance with some example embodiments of the present disclosure.

FIG. 7 illustrates a method 700 of manufacturing a gearbox housing 1 in accordance with some example embodiments of the present disclosure.

At block 702, a housing body 10 is provided. At block 704, an annular support 20 extending along an axial direction A is provided. At block 706, a lateral portion 30 is provided at a side face of the annular support 20 perpendicular to the axial direction A, the lateral portion 30 comprising a hole 32 formed thereon for an input shaft to pass through. At block 708, an annular gear 40 inside of the housing body 10 along a radial direction R is provided, the annular gear 40 being adapted to couple to the annular support 20, wherein a plurality of teeth 42 are circumferentially provided at an inner side of the annular gear 40, and wherein a gear wheel 50 with an output shaft 52 is adapted to couple to the plurality of teeth 42.

In some embodiments, the housing body 10 may be formed via injection molding and then the annular gear 40 may be formed via injection molding.

In some embodiments, the housing body 10 may be formed via injection molding and the annular gear 40 may be mechanically connected to the housing body 10.

In some embodiments, providing the annular gear 40 may comprise coupling a metal ring 60 to the annular gear 40 during the injection molding.

It is to be understood that the apparatus, the structure or the process involved in FIG. 7 have been described above with reference to FIGS. 1-6, and the details will not be described hereinafter for the sake of brevity.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Compared with the conventional approaches, by simply providing the gearbox housing 1 with two parts, the shrinkage thereof can be reduced within a certain extent, and the accuracy of the of the working profile of the gearbox housing can be ensured.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A gearbox housing comprising:
    a housing body, comprising:
        an annular support extending along an axial direction; and
        a lateral portion provided at a side face of the annular support perpendicular to the axial direction, the lateral portion comprising a hole formed thereon for an input shaft to pass through,
        wherein the housing body is formed via injection molding; and
    an annular gear provided inside of the housing body along a radial direction and adapted to couple to the annular support, wherein a plurality of teeth are circumferentially provided at an inner side of the annular gear, and wherein a gear wheel with an output shaft is adapted to couple to the plurality of teeth,
        wherein the annular gear is formed via injection molding,
    wherein the housing body is formed of a material comprising a higher molding temperature point than a molding temperature point of a material of the annular gear.

2. The gearbox housing of claim 1, further comprising a ring made of metal and circumferentially coupled to the annular gear.

3. The gearbox housing of claim 1, wherein the annular gear is integrally formed with the housing body via the injection molding.

4. The gearbox housing of claim 3, wherein the housing body is made of plastic.

5. The gearbox housing of claim 1, wherein the annular gear is made of plastic or metal.

6. The gearbox housing of claim 1, wherein the annular support and the lateral portion are integrally formed.

7. The gearbox housing of claim 1, wherein the annular gear is one of a cycloidal gear, a planetary gear, or a harmonic gear.

8. A method of manufacturing a gearbox housing, comprising:
    providing a housing body, comprising:
        providing an annular support extending along an axial direction;
        providing a lateral portion at a side face of the annular support perpendicular to the axial direction, the lateral portion comprising a hole formed thereon for an input shaft to pass through; and
        providing an annular gear inside of the housing body along a radial direction, the annular gear being adapted to couple to the annular support, wherein a plurality of teeth are circumferentially provided at an inner side of the annular gear, and wherein a gear wheel with an output shaft is adapted to couple to the plurality of teeth,
    wherein the housing body is formed via injection molding and then the annular gear is formed integrally via injection molding.

9. The method of claim 8, wherein providing the annular gear comprises coupling a ring made of metal to the annular gear during the injection molding.

\* \* \* \* \*